United States Patent

Carrano

[11] Patent Number: 5,586,518
[45] Date of Patent: Dec. 24, 1996

[54] MILKING CLUSTER AIR FORK

[75] Inventor: James A. Carrano, Stoughton, Wis.

[73] Assignee: DEC International, Inc., Madison, Wis.

[21] Appl. No.: 411,417

[22] Filed: Mar. 27, 1995

[51] Int. Cl.⁶ ........................................................ A01J 5/04
[52] U.S. Cl. ........................................ 119/14.51; 119/14.54
[58] Field of Search .............................. 119/14.37, 14.51, 119/14.54

[56] References Cited

U.S. PATENT DOCUMENTS

| | | | |
|---|---|---|---|
| 3,079,891 | 3/1963 | Miller | 119/14.51 X |
| 3,776,196 | 12/1973 | Luiz | 119/14.54 X |
| 4,530,307 | 7/1985 | Thompson | 119/14.39 |
| 4,537,152 | 8/1985 | Thompson | 119/14.54 |
| 5,178,095 | 1/1993 | Mein | 119/14.47 |
| 5,218,924 | 6/1993 | Thompson et al. | 119/14.02 |

FOREIGN PATENT DOCUMENTS 1667753  8/1991  U.S.S.R. ............................ 119/14.54

Primary Examiner—Robert P. Swiatek
Attorney, Agent, or Firm—Andrus, Sceales, Starke & Sawall

[57] ABSTRACT

A milking cluster air fork (120) has outlets (122, 124, 126, 128) directing air tubes (80, 82, 84, 86) laterally inwardly of respective milk tubes (58, 60, 62, 64), rather than outwardly, to provide a narrower profile, such that if the dairy animal (22) lifts her rear leg (76, 78) and steps forward, the dew claw (112, 114) on the inside of her leg will not hook an air tube (80, 82, 84, 86) and pull the teat cup (50, 52, 54, 56) off the teat (26, 28, 30, 32).

18 Claims, 4 Drawing Sheets

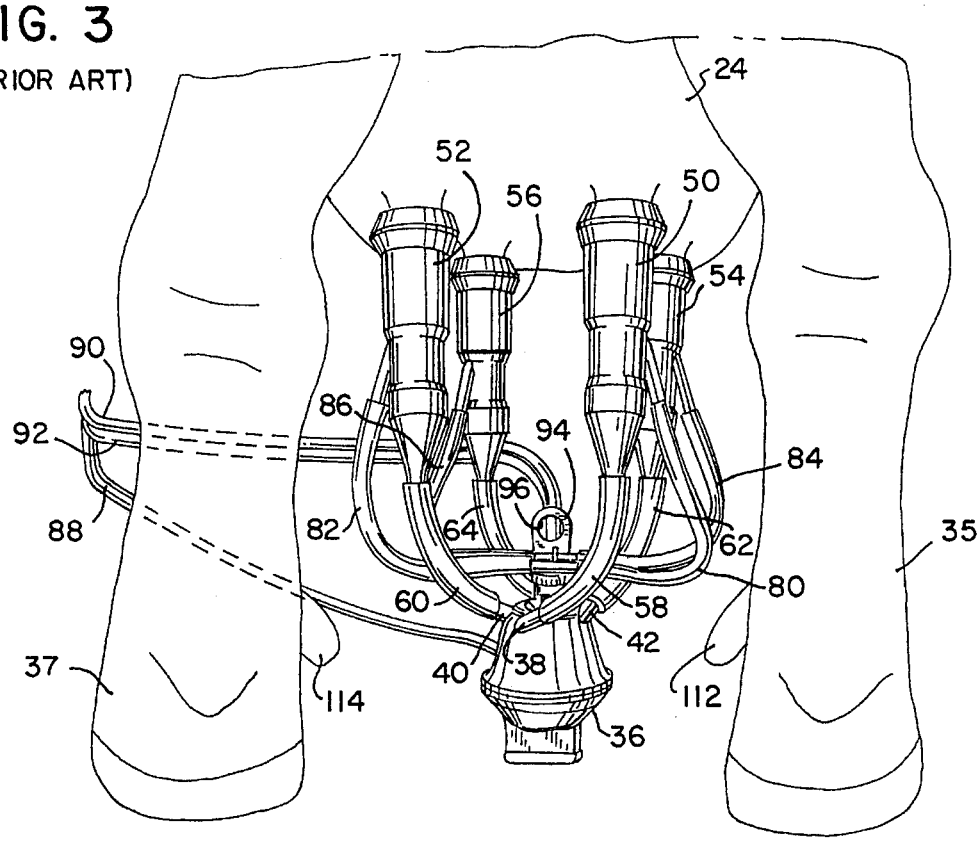
FIG. 3
(PRIOR ART)
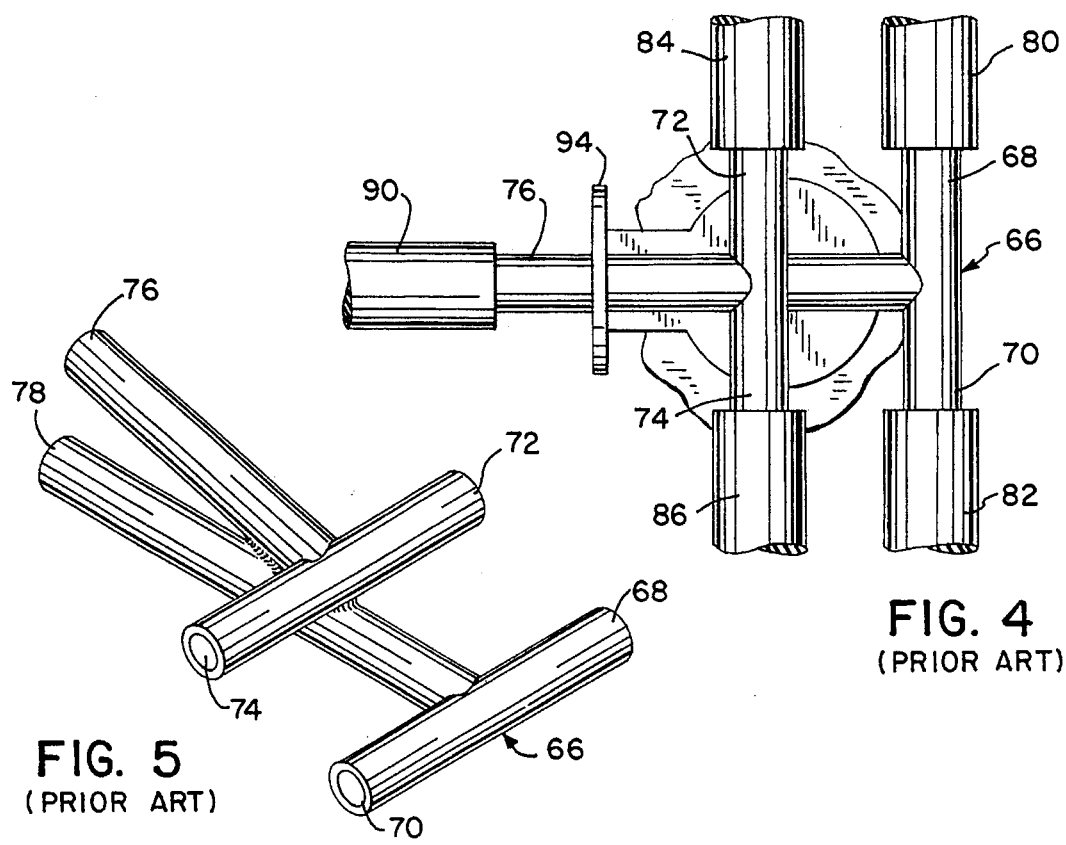
FIG. 4
(PRIOR ART)
FIG. 5
(PRIOR ART)

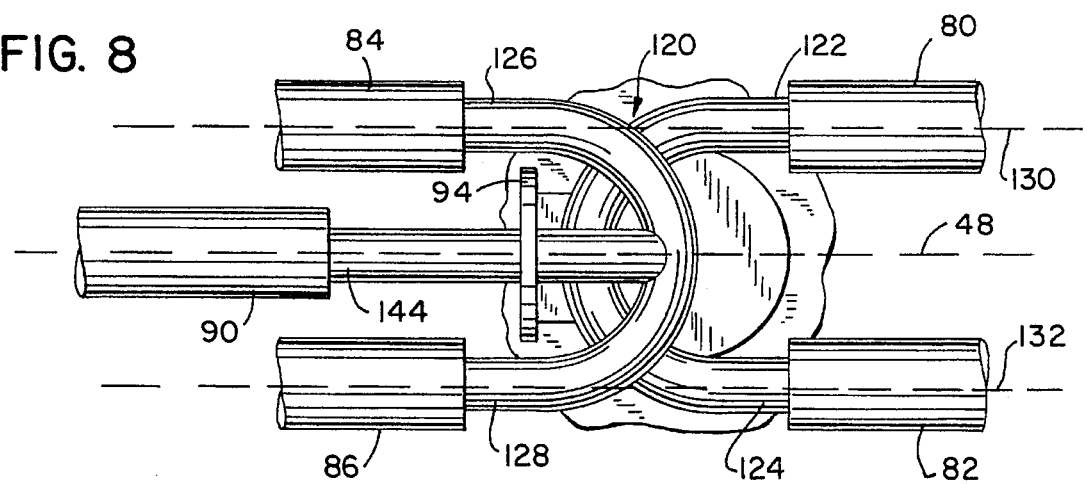
FIG. 8
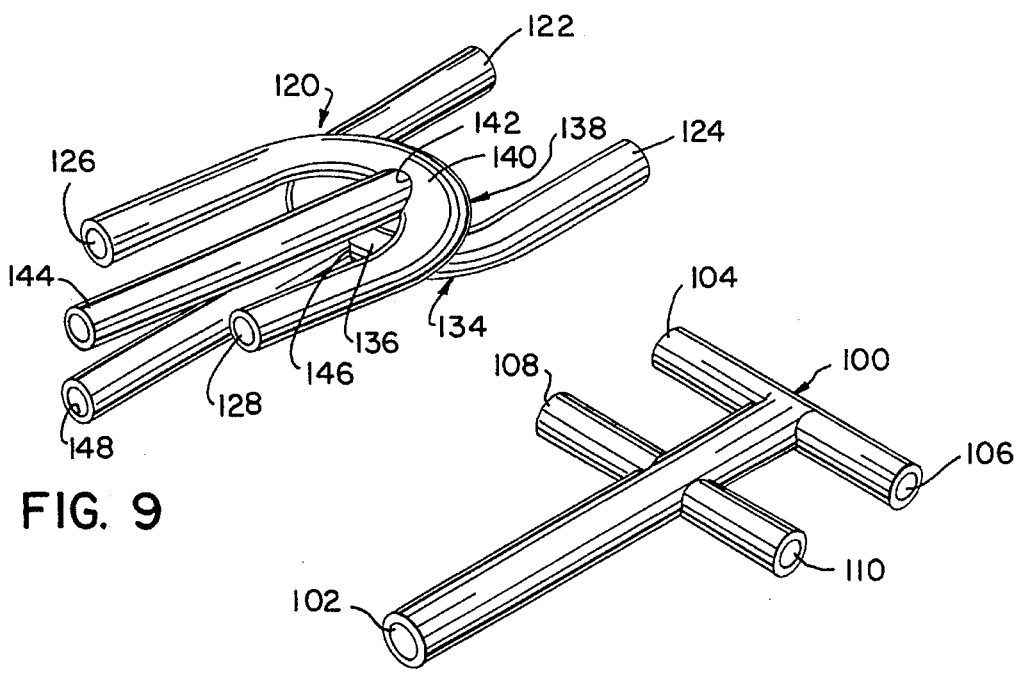
FIG. 9
FIG. 10
(PRIOR ART)
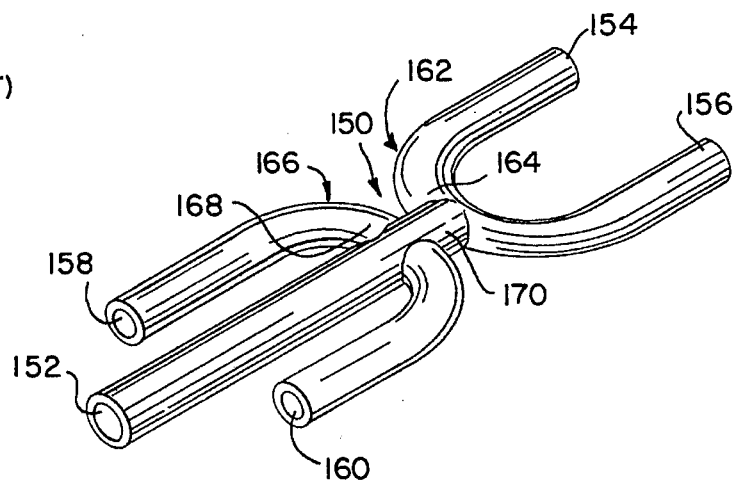
FIG. 11

5,586,518

MILKING CLUSTER AIR FORK

BACKGROUND AND SUMMARY

The invention relates to dairy equipment, and more particularly to milking clusters.

A milking cluster is an assembly attached to the dairy animal's udder during milking. The cluster includes a claw, four shell assemblies, four short milk tubes, four air tubes, and an air fork. Each shell assembly includes an outer shell and an inner liner called an inflation. The short milk tube connects the inflation to the claw which in turn is connected to a milk transport hose subject to vacuum or negative pressure. The air tube connects the space between the inflation and the shell to the air fork. The air fork is connected through one or more air lines to a pulsation device cycling vacuum off and on.

When milking a dairy animal, the inside bore of the inflation is at the system vacuum level, and the space between the inflation and the shell is either at vacuum or at atmospheric pressure depending on the cycle of the pulsation device. When there is atmospheric pressure on the outside of the inflation in the space between the inflation and the shell, the vacuum on the inside of the inflation causes the inflation to collapse. This is known as the rest phase, during which there is no milk flow, i.e. liner closed. When there is vacuum on the outside of the inflation in the space between the inflation and the shell, such vacuum balances the vacuum on the inside of the inflation, and the inflation can relax or expand. This is the milk phase, during which milk flows, i.e. liner open. Most milking clusters operate efficiently with pulsation rates between 45 and 60 cycles per minute. The pulsing movement massages the teat. In the rest phase, the collapse of the inflation squeezes the teat, forcing blood in the teat to circulate. Without this rest phase, blood would not circulate throughout the teat, and injury to the teat might result. The milk phase and the rest phase may have some overlap.

The purpose of the air fork is to distribute the vacuum and atmospheric air pulses to the shells, to apply the cycling vacuum and atmospheric air pulses to the space between the inflation and the shell. Pulsation systems are either simultaneous (sometimes called single shot) or alternating. Simultaneous means that all four teat cups will be in either the milk phase or the rest phase at the same time. Alternating pulsation systems will have the two front teat cups in the milk phase and the two rear teat cups in the rest phase at one time, and then alternate to just the opposite. Alternating pulsators are usually more desirable because they provide more even milk flow, excellent vacuum stability, and the option of adjusting the two rear teat cups to a greater milk/rest ratio than the two front teat cups.

It is desirable that the teat cup remain attached to the teat until milking is completed, otherwise there is a rapid admission of air into the now open upper mouth of the liner, which is undesirable. One cause of such detachment is movement of the dairy animal if she lifts one or her rear legs and steps forward because the dew claw on the inside of her leg just above the hoof can hook the air tube between the air fork and the respective teat cup, and pull the teat cup off the teat. The present invention addresses and solves this problem.

BRIEF DESCRIPTION OF THE DRAWINGS

FIG. 3 is a view taken along line 3—3 of FIG. 2.

FIG. 4 is a view taken along line 4—4 of FIG. 2.

FIG. 5 is an isometric view of an air fork known in the prior art.

FIG. 8 is a view taken along line 8—8 of FIG. 6.

FIG. 9 is an isometric view of an air fork in accordance with the present invention.

FIG. 10 is an isometric view showing another air fork known in the prior art.

FIG. 11 is an isometric view showing an alternate embodiment of an air fork in accordance with the present invention.

DETAILED DESCRIPTION

Prior Art

Figure 1:
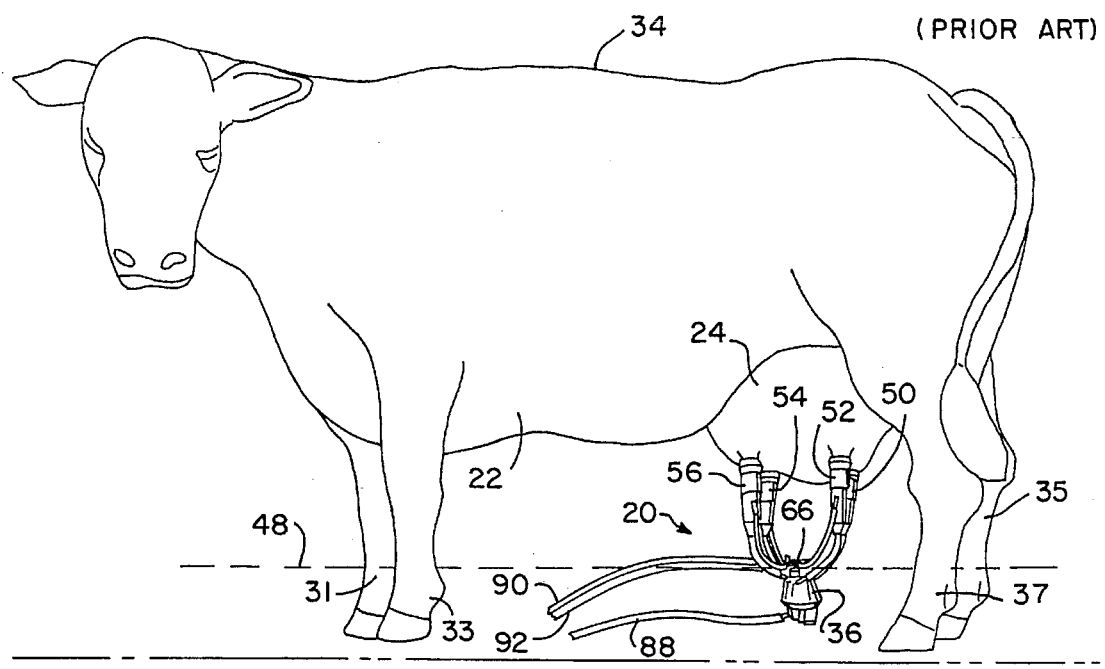
FIG. 1 is a side view of a milking cluster attached to a dairy animal, as known in the prior art.
Figure 2:
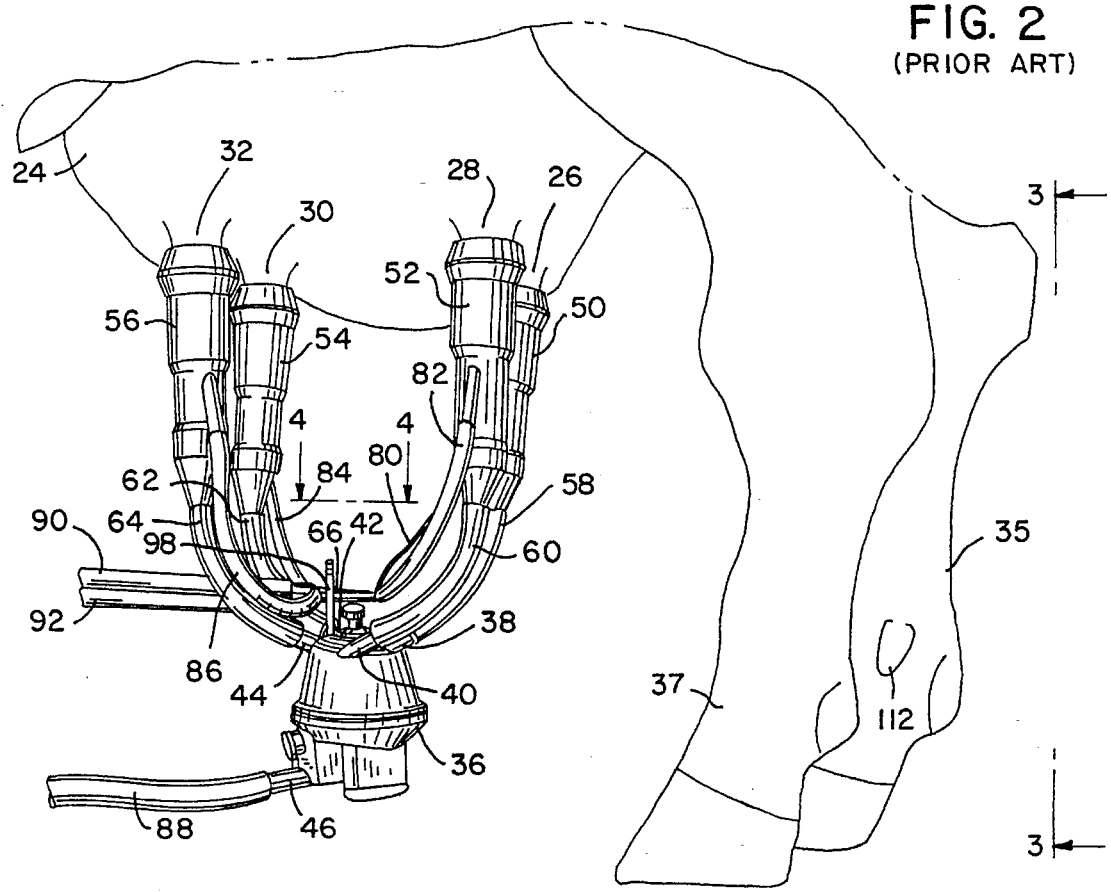
FIG. 2 is an enlarged view of the milking cluster of FIG. 1.
Figure 6:
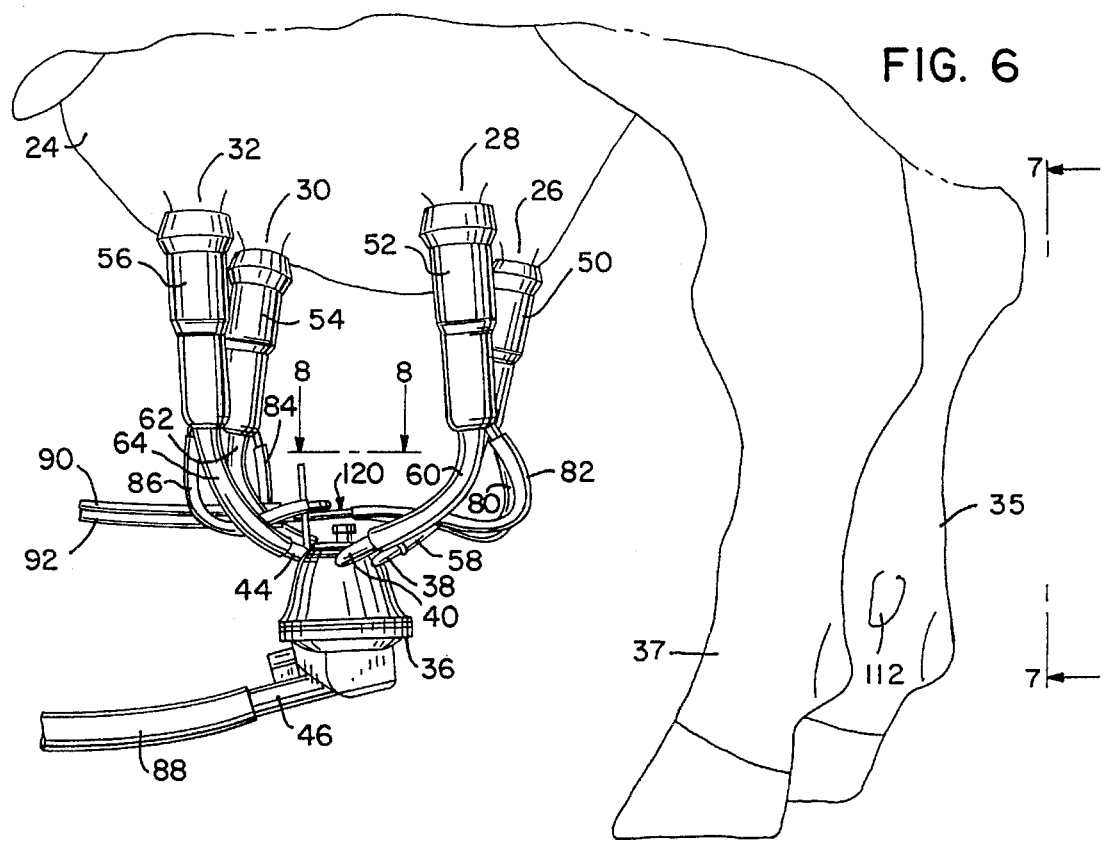
FIG. 6 is a side view like FIG. 2 but illustrating the present invention.

FIGS. 1–3 show a milking cluster 20 known in the prior art, and for which further reference may be had to U.S. Pat. Nos. 4,530,307, 4,537,152, 5,178,095, and 5,218,924, incorporated herein by reference. Dairy animal 22, such as a cow, has an udder 24 and a plurality of teats 26, 28, 30, 32. The animal has a backbone 34 defining an axially extending longitudinal direction. A milking claw 36 has a plurality of inlets 38, 40, 42, 44, and an outlet 46. The claw lies along a central longitudinal axis 48 extending between the animal's front legs 31 and 33 and between the animal's rear legs 35 and 37 and generally parallel to backbone 34. Teat cups 50, 52, 54, 56 are each connected to a respective teat 26, 28, 30, 32 of udder 24. Short milk tubes 58, 60, 62, 64 each connect a respective claw inlet to a respective teat cup. An air fork 66, FIGS. 2–5, has outlets 68, 70, 72, 74, and one or more inlets 76, 78. Air tubes 80, 82, 84, 86 each connect a respective air fork outlet to a respective teat cup. A milk hose 88 is connected to claw outlet 46. One or more vacuum pulsation air lines 90, 92 are connected to respective air fork inlets 76, 78. The claw has an upper eye hook 94 with a first upper circular hole 96 for hanging the claw when not in use, and a lower oblong hole 98 loosely receiving air fork inlets 76, 78 extending therethrough. In herringbone type and other conventional milking parlors, it is typical that milk hose 88 and air lines 90, 92 extend forwardly and then laterally to the side, though the milk hose and the air lines may extend longitudinally rearwardly along axis 48 between the cow's rear legs 35 and 37, or longitudinally forwardly along axis 48 between the cow's front legs 31 and 33.

The milking arrangement shown in FIGS. 1–5 is of the above noted alternating pulsation type. While vacuum is applied through air line 92, atmospheric air pressure is applied through air line 90, and vice versa. During the portion of the cycle when vacuum is applied through air line 92, such vacuum is applied to air fork inlet 78 and through air fork outlets 68 and 70 to air tubes 80 and 82 to rear teat cups 50 and 52, such that rear teats 26 and 28 are in the milk phase, and milk flows from the rear teats through milk tubes 58 and 60 to claw inlets 38 and 40 for collection in claw 36 and discharge through outlet 46 and out through milk hose 88. Milk flows from the rear teats because vacuum is applied to the space between the rear teat cup shells and their respective inflations such that the latter can relax and expand, as above noted, and all as is known in the prior art.

During this portion of the cycle, atmospheric air pressure is applied by air line 90 to air fork inlet 76 to air fork outlets 72 and 74 to air tubes 84 and 86 to front teat cups 54 and 56 such that the front teats are in the rest phase. In this phase, the atmospheric air pressure in the space between the teat cup shells and their respective inflations causes a differential pressure across the inflation or liner due to the vacuum on the inside thereof, which in turn collapses the liner, blocking milk flow, and also squeezing and massaging the teat to force blood circulation, as above noted, and all as is known in the prior art. It is typical that air lines 90 and 92 will be alternated between their opposite vacuum and atmospheric air pressure states at a pulsation rate between 45 and 60 cycles per minute.

The other type of pulsation system is the simultaneous or single shot type. In this type of system, the air fork, such as 100, FIG. 10, has a singular inlet 102 communicating with each of four outlets 104, 106, 108, 110 connected respectively to air lines 80, 82, 84, 86, such that all four teat cups 50, 52, 54, 56 will be in either the milk phase or in the rest phase at the same time, as noted above, and all as is known in the prior art. In air fork 100 of FIG. 10, inlet 102 is in communication with all four outlets 104, 106, 108, 110. In air fork 66 of FIG. 5, inlet 76 is in communication with outlets 72 and 74, but not outlets 68 and 70; and inlet 78 is in communication with outlets 68 and 70, but not outlets 72 and 74.

As noted above, it is desirable that the teat cups remain attached to the cow's teats until the milking operation is completed. If the teat cup becomes detached from the teat during milking, there will be a rapid admission of air into the interior of the inflation through the now open mouth thereof which formerly received the teat. This rapid admission of air is undesirable. One cause of such detachment can occur when the cow lifts either of her rear legs and steps forward, because either of the dew claws 112 or 114, FIG. 3, on the inside of her legs can hook an air tube and pull the teat cup off the teat. Right rear dew claw 112 can hook right air tube 80 and/or 84, and pull teat cup 50 and/or 54 off the respective teat. Left rear dew claw 114 can hook left air tube 82 and/or 86, and pull teat cup 52 and/or 56 off the respective teat. Each air tube 80, 82, 84, 86 extends from its respective air fork outlet laterally outwardly of its respective milk tube 58, 60, 62, 64 into the path of movement of dew claw 112 or 114.

Present Invention

Figure 7:
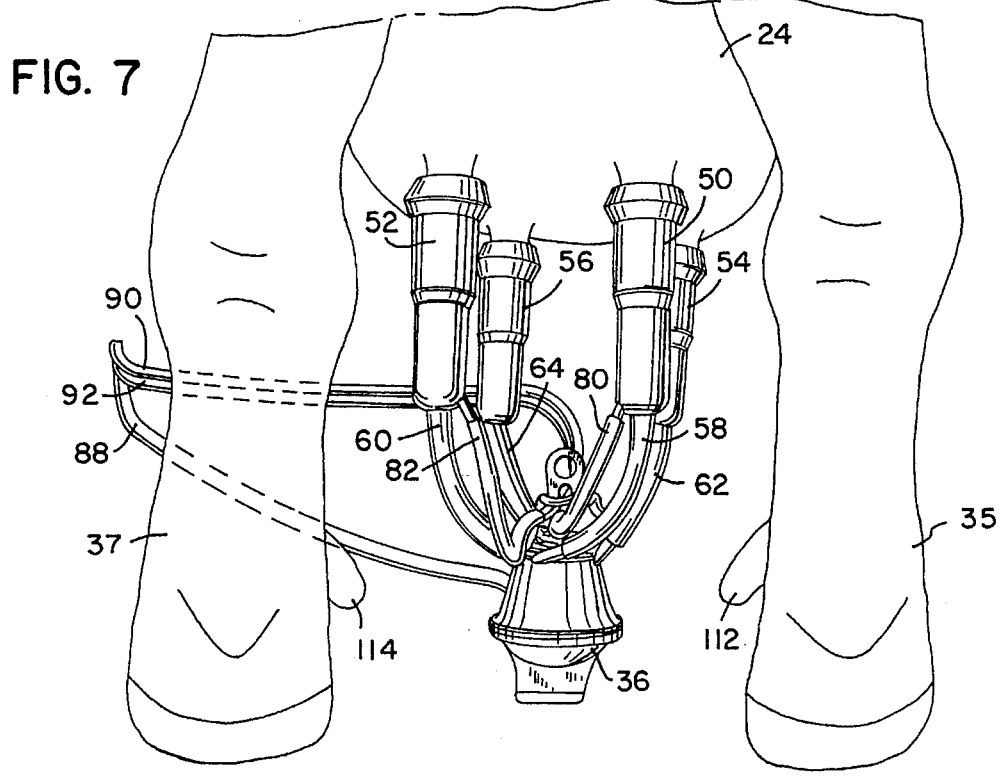
FIG. 7 is a view taken along line 7—7 of FIG. 6.

FIGS. 6–9 and 11 illustrate the present invention solving the noted problem, and use like reference numerals from the above figures where appropriate to facilitate understanding. Bends are provided in the air fork outlets to route the air tubes initially longitudinally, rather than laterally. In this manner, each air tube 80, 82, 84, 86 remains laterally inward of its respective milk tube 58, 60, 62, 64, to provide a narrower profile, as seen by contrasting FIG. 7 against FIG. 3. The air fork outlets direct the air tubes laterally inwardly of the milk tubes, rather than outwardly of the milk tubes. In FIG. 7, if the cow lifts either of her rear legs 35 or 37 and steps forward, the dew claw 112 or 114 on the inside of her leg will not hook an air tube 80, 82, 84, 86 and pull the respective teat cup off the teat.

Air fork 120, FIGS. 6–9, has air fork outlets 122, 124, 126, 128 extending generally axially longitudinally, i.e. generally parallel to the cow's backbone 34, such that air tubes 80, 82, 84, 86 initially extend generally axially longitudinally therefrom. Air tubes 80, 82, 84, 86 are laterally between respective milk tubes 58, 60, 62, 64 and central longitudinal axis 48. Air fork outlets 122 and 124 extend axially longitudinally rearwardly from the air fork and are laterally spaced on opposite sides of central longitudinal axis 48. Air fork outlets 126 and 128 extend axially longitudinally forwardly from the air fork and are laterally spaced on opposite sides of central longitudinal axis 48. Air fork outlets 122 and 126 are colinear and point in opposite longitudinal directions along a right longitudinal axis 130 laterally spaced from central longitudinal axis 48. Air fork outlets 124 and 128 are colinear and point in opposite longitudinal directions along a left longitudinal axis 132 laterally spaced from central longitudinal axis 48 on the opposite side thereof from right longitudinal axis 130. Axes 48, 130 and 132 are substantially parallel.

Air fork 120 includes a first U-shaped portion 134 having first and second legs providing outlets 122 and 124, which legs are joined by a central bight 136. The air fork includes a second U-shaped portion 138 having legs providing outlets 126 and 128, which legs are joined by a central bight 140. U-shaped portions 134 and 138 extend in opposite longitudinal directions, with legs 122 and 124 pointing rearwardly, and legs 126 and 128 pointing forwardly. Bights 136 and 140 extend laterally and are proximate each other.

In the embodiment in FIG. 9, U-shaped portions 134 and 138 are overlapped, with bight 136 being forward of bight 140. The U-shaped portions are preferably stainless steel, and may be welded to each other. Bight 140 has a port 142 facing longitudinally forwardly. Air fork inlet 144 extends axially longitudinally forwardly from port 142 for connection to air line 90. Inlet 144 is laterally spaced between legs 126 and 128. Bight 136 has a port 146 facing longitudinally forwardly. Air fork inlet 148 extends axially longitudinally forwardly from port 146 for connection to air line 92. Inlet 148 is laterally spaced between legs 126 and 128.

Air fork 120, FIG. 9, is for use with the above noted alternating type pulsation system. Inlet 144 is in communication with outlets 126 and 128, but not outlets 122 and 124. Inlet 148 is in communication with outlets 122 and 124, but not outlets 126 and 128.

FIG. 11 illustrates an alternate embodiment showing an air fork 150 for use in a simultaneous, or single shot, type pulsation system. Air fork inlet 152 is in communication with each of the four air fork outlets 154, 156, 158, 160. The air fork has a U-shaped portion 162 with a central bight 164 and legs 154 and 156 extending axially longitudinally rearwardly therefrom. The air fork has a second U-shaped portion 166 with a central bight 168 and legs 158 and 160 extending axially longitudinally forwardly therefrom. Bights 164 and 168 have a common passage 170 therebetween. The air fork has a singular air inlet 152 extending longitudinally forwardly and communicating with bights 164 and 166 and common passage 170, and laterally spaced between legs 158 and 160.

It is recognized that various equivalents, alternatives and modifications are possible within the scope of the appended claims.

I claim:

1. A milking cluster for a dairy animal having an udder and a plurality of teats, and a backbone defining an axially extending longitudinal direction, comprising:

a claw having a plurality of inlets, and an outlet, said claw lying along a central longitudinal axis extending between the animal's legs and generally parallel to said backbone;

a plurality of teat cups, each connected to a respective teat;

a plurality of milk tubes, each connecting a respective claw inlet to a respective teat cup;

an air fork having a plurality of outlets, and one or more inlets;

a plurality of air tubes, each connecting a respective air fork outlet to a respective teat cup;

a milk hose connected to said claw outlet;

one or more vacuum pulsation air lines connected to said one or more air fork inlets;

wherein said air fork outlets direct said air tubes laterally inwardly of said milk tubes, rather than outwardly of said milk tubes, such that if the animal lifts her rear leg and steps forward, the dew claw on the inside of her leg will not hook an air tube and pull the respective teat cup off the teat, and wherein said air fork outlets extend generally axially longitudinally such that said air tubes extend generally axially longitudinally therefrom.

2. The invention according to claim 1 wherein said air fork outlets comprise first and second air fork outlets extending axially longitudinally rearwardly from said air fork and laterally spaced on opposite sides of said central longitudinal axis, and third and fourth air fork outlets extending axially longitudinally forwardly from said air fork and laterally spaced on opposite sides of said central longitudinal axis.

3. The invention according to claim 2 wherein said first and third air fork outlets are colinear and point in opposite longitudinal directions along a right longitudinal axis laterally spaced from said central longitudinal axis, and said second and fourth air fork outlets are colinear and point in opposite longitudinal directions along a left longitudinal axis laterally spaced from said central longitudinal axis on the opposite side thereof from said right longitudinal axis.

4. The invention according to claim 3 wherein said right, central and left longitudinal axes are substantially parallel.

5. The invention according to claim 2 wherein said air fork comprises:

a first U-shaped portion having first and second legs joined by a first central bight, said first leg providing said first air fork outlet, said second leg providing said second air fork outlet;

a second U-shaped portion having third and fourth legs joined by a second central bight, said third leg providing said third air fork outlet, said fourth leg providing said fourth air fork outlet.

6. The invention according to claim 5 wherein said first and second U-shaped portions extend in opposite longitudinal directions, with said first and second legs pointing rearwardly, and said third and fourth legs pointing forwardly.

7. The invention according to claim 6 wherein said first and second bights extend laterally and are proximate each other.

8. The invention according to claim 7 wherein said first and second U-shaped portions are overlapped, and wherein said first bight is forward of said second bight.

9. The invention according to claim 8 wherein:

said first and second legs extend longitudinally rearwardly from said first bight;

said first bight has a first port facing in a first longitudinal direction;

said one or more air fork inlets comprise a first air fork inlet extending longitudinally in said first longitudinal direction from said first port;

said third and fourth legs extend longitudinally forwardly from said second bight;

said second bight has a second port facing in said first longitudinal direction;

said one or more air fork inlets comprise a second air fork inlet extending longitudinally in said first longitudinal direction from said second port.

10. The invention according to claim 7 wherein:

said first and second legs extend longitudinally rearwardly from said first bight;

said third and fourth legs extend longitudinally forwardly from said second bight;

said first and second bights are joined by a common passage therebetween;

said one or more air fork inlets comprise a singular air fork inlet extending longitudinally and communicating with said common passage.

11. The invention according to claim 10 wherein one of said bights has a port facing in a first longitudinal direction, and said air fork inlet extends longitudinally from said port.

12. An air fork for a milking cluster for a dairy animal having an udder and a plurality of teats, and a backbone defining an axially extending longitudinal direction, said cluster having a claw with a plurality of inlets, and an outlet, said claw lying along a central longitudinal axis extending between the animal's legs and generally parallel to said backbone, a plurality of teat cups, each connected to a respective teat, a plurality of milk tubes, each connecting a respective claw inlet to a respective teat cup, a plurality of air tubes, each connected to a respective teat cup, a milk hose connected to said claw outlet, and one or more vacuum pulsation air lines, said air fork comprising a plurality of outlets for connection to said air tubes, and one or more inlets for connection to said one or more air lines, said air fork outlets directing said air tubes along directions laterally inward of respective milk tubes, rather than outward of said milk tubes, such that if the animal lifts her rear leg and steps forward, the dew claw on the inside of her leg will not hook an air tube and pull the teat cup off the teat, wherein said air fork outlets extend generally axially longitudinally such that said air tubes extend generally axially longitudinally therefrom.

13. The invention according to claim 12 wherein said air fork outlets comprise first and second air fork outlets extending axially longitudinally rearwardly from said air fork and laterally spaced on opposite sides of said central longitudinal axis, and third and fourth air fork outlets extending axially longitudinally forwardly from said air fork and laterally spaced on opposite sides of said central longitudinal axis.

14. The invention according to claim 13 wherein said first and third air fork outlets are colinear and point in opposite longitudinal directions along a right longitudinal axis laterally spaced from said central longitudinal axis, and said second and fourth air fork outlets are colinear and point in opposite longitudinal directions along a left longitudinal axis laterally spaced from said central longitudinal axis on the opposite side thereof from said right longitudinal axis.

15. The invention according to claim 13 wherein said air fork comprises:

a first U-shaped portion having first and second legs joined by a first central bight, said first leg providing said first air fork outlet, said second leg providing said second air fork outlet;

a second U-shaped portion having third and fourth legs joined by a second central bight, said third leg providing said third air fork outlet, said fourth leg providing said fourth air fork outlet.

16. The invention according to claim 15 wherein:

said first and second U-shaped portions extend in opposite longitudinal directions, with said first and second legs pointing rearwardly, and said third and fourth legs pointing forwardly;

said first and second bights extend laterally and are proximate each other;

said first and second U-shaped portions are overlapped, with said first bight being forward of said second bight;

said first and second legs extend longitudinally rearwardly from said first bight;

said first bight has a first port facing in a first longitudinal direction;

said one or more air fork inlets comprise a first air fork inlet extending longitudinally in said first longitudinal direction from said first port;

said third and fourth legs extend longitudinally forwardly from said second bight;

said second bight has a second port facing in said first longitudinal direction;

said one or more air fork inlets comprise a second air fork inlet extending longitudinally in said first longitudinal direction from said second port.

17. The invention according to claim 15 wherein:

said first and second U-shaped portions extend in opposite longitudinal directions, with said first and second legs pointing rearwardly, and said third and fourth legs pointing forwardly;

said first and second bights extend laterally and are proximate each other;

said first and second legs extend longitudinally rearwardly from said first bight;

said third and fourth legs extend longitudinally forwardly from said second bight;

said first and second bights are joined by a common passage therebetween;

said one or more air fork inlets comprise a singular air fork inlet extending longitudinally and communicating with said common passage.

18. An air fork for a milking cluster for a dairy animal having an udder and a plurality of teats, and a backbone defining an axially extending longitudinal direction, said cluster having a claw with a plurality of inlets, and an outlet, said claw lying along a central longitudinal axis extending between the animal's legs and generally parallel to said backbone, a plurality of teat cups, each connected to a respective teat, a plurality of milk tubes, each connecting a respective claw inlet to a respective teat cup, a plurality of air tubes, each connected to a respective teat cup, a milk hose connected to said claw outlet, and one or more vacuum pulsation air lines, said air fork comprising a plurality of outlets for connection to said air tubes, and one or more inlets for connection to said one or more air lines, said air fork outlets having bends routing said air tubes initially longitudinally, rather than laterally, such that each air tube remains laterally inward of its respective milk tube, to provide a narrower profile, such that if the animal lifts her rear leg and steps forward, the dew claw on the inside of her leg will not hook an air tube and pull the teat cup off the teat.

\* \* \* \* \*